United States Patent Office 3,298,861
Patented Jan. 17, 1967

3,298,861
HEAT AND LIGHT STABLE SOLID POLYOLEFIN
ARTICLE AND PROCESS OF MAKING SAME
Domenick Donald Gagliardi, 185 Howland Road, East
Greenwich, R.I. 02818
No Drawing. Filed Oct. 24, 1963, Ser. No. 318,507
11 Claims. (Cl. 117—138.8)

In accordance with the provisions of 35 U.S.C. 120, reference is made to the following copending applications:

S.N. 91,639, filed February 27, 1961, now U.S. 3,098,-692.
S.N. 106,173, filed April 28, 1961, now U.S. 3,140,-194.
S.N. 123,988, filed July 14, 1961, now U.S. 3,148,017.
S.N. 188,568, filed April 19, 1962, now U.S. 3,145,073.
S.N. 189,280, filed April 23, 1962, now U.S. 3,150,-917.
S.N. 196,908, filed May 23, 1962, now U.S. 3,169,823.

This invention relates to (a) processes for improving the heat and light stability of articles made of solid polyolefins and (b) the resulting stabilized polyolefin articles. More particularly, it is concerned with low cost treatments that are easily applied to most any type of article that has been preformed from solid high molecular weight olefin polymers, e.g., fibers, films, filaments, yarns, woven fabrics or other extruded, molded or shaped articles, to improve the resistance of the article against the detrimental effect of heat or light.

FIELD OF INVENTION

Solid high molecular weight polymers of olefins have become very important items of commerce because they can be manufactured in extremely large quantities from very cheap materials. In addition to their low cost, these polymers possess many desirable properties such as good strength, easy molding characteristics, general inertness, light weight and good solvent resistance. The polyolefins unfortunately possess some important disadvantages.

Many commercial forms of polyolefins contain small amounts of impurities, e.g., residues of catalysts used in the preparation of the polymers. These impurities generally decrease the stability of the polyolefins with respect to heat or light. However, even highly purified polyolefins, e.g., polyethylene and polypropylene, are detrimentally effected by both heat and light. This instability of the polymers is well known and much research and development work has been expended in an effort to provide ways in which the heat and light stability of the polymers themselves can be improved. The work has also sought for stabilizers or inhibitors by which compositions of the polymers can be modified to improve their heat and light stability.

The principal approach to this stability problem has been to include stabilizing agents in the polymer by melt-mixing to increase the heat and light stability of the polymer prior to extrusion, molding or other shaping of the polymer into a desired form. Disclosures of previous attempts at the stabilization of polyolefins, particularly those which may contain small quantities of polymerization catalyst residues, may be found in the technical and patent literature, e.g., see British Patents 820,967, 828,-320, 832,024, 847,236, 850,499, 871,196 and 886,218, and U.S. Patents 2,967,852, 2,981,716, 3,039,993 and 3,082,187.

Many polymers, particularly the cellulose esters such as cellulose acetate and ethyl cellulose, and polyvinyl esters, such as polyvinyl chloride, must be compounded with plasticizers in order to produce moldable and useable plastic materials. Polyolefins, on the other hand, generally do not require compounding with plasticizers to provide extrudable, moldable or otherwise shapeable material. However, plasticizers have been incorporated in polyolefins and in some cases have been referred to as crystallization enhancers, e.g., see U.S. Patent 3,000,845.

With a view to further improvement, attempts have been made to uncover materials which may be mixed with high molecular weight polymers to act as combination plasticizer and stabilizer, e.g., see U.S. Patent 2,985,-604. In any event, plasticizers may, in one sense, be viewed as heat stabilizers since they permit a compatible polymer with which they are compounded to be shaped or molded faster at a lower temperature so that there is less opportunity for the plastic material being molded to undergo heat deterioration before the plastic is molded into the finished shape. Hence, the admixing of modifying materials with polyolefins to form uniform mixtures has been the general prior method employed to stabilize the polyolefins against heat or light damage.

Whether some material which is incorporated in some substantial amount in a polyolefin is regarded as a stabilizer or as a plasticizer, the added material generally reduces the melting or softening point of the resulting plastic composition. Also, the added materials will usually add substantially to the cost of the plastic material. Since low cost is a most attractive feature of the polyolefins, the method of attaining stability by uniform admixture of stabilizing agents is undesirable. Likewise, the needs of polyolefin consumers generally require increased softening point, not decreased and this militates against this method of improving heat and light stability of polyethylene, polypropylene and similar polyolefins.

OBJECTS

A principal object of this invention is the provision of new processes for improving the heat and light stability of articles made of solid polyolefins. Further objects include:

(1) The provision of new methods of treating preformed polyolefin articles to stabilize them against deteriorating effects of heat and light without substantially adding to the cost of the article and without detrimentally affecting the softening or melting point of the polyolefin of which the article is formed.

(2) The provision of methods for treating polyolefins after they have been shaped into an article in order to stabilize the article against heat and light deterioration without requiring addition of any or as much stabilizing or other modifying agent to the polymer prior to the molding or other forming of the polymer.

(3) The provision of polyolefin heat and light stabilizing procedures which also provide other beneficial effects, e.g., increase in receptivity to dyes, pigments and other coating compositions.

(4) The provision of heat and light stabilizing procedures which may be applied to most any preformed article of solid polyolefin including films, filaments, spun yarns, woven and non-woven fabrics, foams, sheets, rods, tubes and other extruded, molded, cast or otherwise shaped articles.

(5) The provision of new forms of polyolefin articles which result from the new treating methods and, as compared with the untreated articles, have the same outward appearance, but can be maintained at elevated temperatures over much longer periods of time without melting or otherwise changing shape.

(6) The provision of new heat and light stabilized articles formed of polyolefin material that in itself does not have the desired heat or light stability.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

GENERAL DESCRIPTION

These objects are accomplished according to the present invention by:

(A) Applying to the surface of a preformed article made of solid polyolefin an organic substituted phosphoric acid, or a salt thereof, represented by the following general formula:

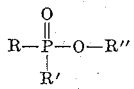

wherein R is a radical selected from the group consisting of alkyl, cycloalkyl, aryl, alkyloxy, cycloalkyloxy and aryloxy, R' is a monovalent radical selected from the group consisting of hydroxy, alkyl, cycloalkyl, aryl, alkyloxy, cycloalkyloxy and aryloxy, and R'' is a monovalent radical selected from the group consisting of hydrogen, and

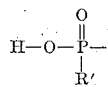

and (B) Heating the article with the applied organic substituted phosphoric acid to a temperature at least 10° C. below the melting point of the solid polyolefin of which the article is formed, and above about 100° C.

The radicals R, R' and R'', when they are organic radicals, preferably contain between 2 and 20 carbon atoms and the radicals may be substituted with one or more halogen atoms, i.e., chlorine, bromine, iodine or fluorine atoms. Also the radical R may be polyvalent, advantageously divalent, joining two or more of the phosphate or phosphonate radicals.

Advantageously, the new methods employ orthophosphates or pyrophosphates of the following formula:

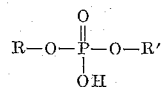

wherein R is a radical selected from the group consisting of hydrogen, alkyl, cycloalkyl and aryl, R' is a radical selected from the group consisting of alkyl, cycloalkyl, aryl, and

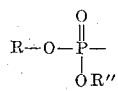

and R'' is a radical selected from the group consisting of alkyl, cycloalkyl, and aryl.

The application of the organic substituted phosphoric acid is preferably accomplished by applying to the preformed article a solution in which the organic phosphoric acid or salt is dissolved in a volatile solvent. Advantageously, the article with the applied material is heated at a temperature between about 100° and 150° C. and the time of heating is between about 0.1 and 120 minutes and preferably about 1 to 15 minutes, the time generally being longer the lower the temperature, but being sufficient to imbue the article surface with at least a portion of the applied organic substituted phosphoric acid or salt.

Advantageously, the organic substituted phosphoric acid, e.g., butyl diacid orthophosphate is applied in conjunction with a heavy metal selected from the group consisting of cadmium, chromium, cobalt, nickel, tin and zinc. Preferably the heavy metal ultimately occurs on the article in the form of a heavy salt of the organic phosphoric acid. This can be accomplished by applying a solution or dispersion which contains the heavy metal salt of the phosphoric acid per se or a mixture of the organic substituted phosphoric acid and the salt of such heavy metal formed of an acid which upon being heated with the phosphoric acid will produce the heavy metal salt of the phosphoric acid, e.g., chromium acetate. Alternatively, the preformed polyolefin article may be treated with the organic phosphoric acid per se and this article may then be contacted with an aqueous or organic solvent solution of the heavy metal salt of a weak acid to form upon the article, by combination with the preapplied phosphoric acid, the heavy metal salt of the organic substituted phosphoric acid.

If desired, this new treatment applied to the surface of a preformed article may be supplemented by surface treatment with other reagents, e.g., amino compounds, dyes, pigments, oil-repellents, anti-static agents or the like.

A post-treatment as provided by this invention of polyolefin articles previously formed by extrusion, molding or other shaping of solid high molecular weight olefin polymer, substantially improves both the heat and light stability of the article. The economic significance of this will be immediately apparent. Thus, since a minimum amount of treating reagent is required, the ultimate cost attributable to the heat and light stabilizing operation is very low. Also, the procedure is so simple that the mechanical operation adds substantially little to the overall cost and the treatment may be applied successfully to most any form of article, including even complex contoured articles such as woven fabrics, foams or the like.

EXAMPLES

A more complete understanding of the new procedures and resulting products of this invention may be obtained by reference to the following data obtained from actual operations in accordance with the invention wherein all parts of percentages are reported by weight unless otherwise specified.

Example 1

Small swatches of fabric woven in plain weave from polypropylene monofilament were padded through solutions containing: 3% organic phosphoric acid, and 97% mixture of water-isopropanol 1:1.

The wet pick-up was 80%. After padding, the samples were dried and heated at 120° C. for 15 minutes. After heating, the samples were scoured for 5 minutes in a 0.1% solution of non-ionic detergent (Tergitol NPX) at 60° C., rinsed and dried 5 minutes at 110° C. Control samples of the fabric were padded only through water. These samples were subjected to light stability tests in Fade-Ometer exposures. The following organic phosphoric acids were tested:

(1) Di-butyl acid orthophosphate;
(2) Butyl diacid orthophosphate;
(3) Di-butyl acid pyrophosphate;
(4) Diethyl acid orthophosphate;
(5) Ethyl diacid orthophosphate;
(6) Iso-octyl diacid pyrophosphate;
(7) Isopropyl diacid orthophosphate;
(8) Di-iso-octyl acid orthophosphate;
(9) Di-methyl acid pyrophosphate;
(10) Mono-lauryl diacid orthophosphate;
(11) Water control.

The results of these tests are shown in Table I. At the 50-hour exposure, the treatments produced substantial improvement in light stability. Some of the samples were exposed for 100 hours. These showed great improvement over the untreated control.

TABLE I.—LIGHT STABILITY ON AVISUN FABRIC PRODUCED BY ORGANIC PHOSPHORIC ACIDS

| Sample No. | Initial | Warp Grab Tensile, lbs./in. | |
|---|---|---|---|
| | | 50 hours | 100 hours |
| #11 control | 225 | 145 | 61 |
| #1 | 216 | 204 | |
| #2 | 227 | 221 | 172 |
| #3 | 229 | 219 | 161 |
| #4 | 223 | 211 | |
| #5 | 227 | 224 | 197 |
| #6 | 209 | 197 | |
| #7 | 222 | 213 | 177 |
| #8 | 220 | 214 | 141 |
| #9 | 225 | 219 | |
| #10 | 211 | 195 | |

*Example 2*

This example reports test results on mixtures of a free organic phosphoric acid and various heavy metal salts.

Using the padding and heating procedure described in Example 1, solutions of the following acid/salt mixtures dissolved in a 1:1 mixture of water and isopropanol were used to treat swatches of polypropylene fabric:

(1) Untreated polypropylene fabric;
(2) 3% Butyl acid phosphate;
(3) 3% Butyl acid phosphate +1% Cu acetate;
(4) 3% Butyl acid phosphate +1% Cr acetate;
(5) 3% Butyl acid phosphate +1% Ni acetate;
(6) 3% Butyl acid phosphate +1% zinc acetate;
(7) 3% Butyl acid phosphate +1% Co acetate.

The treated and scoured samples were exposed for 100 hours in a Fade-Ometer. Table II below shows the test results.

TABLE II.—INFLUENCE OF METAL SALTS ON THE LIGHT STABILITY PRODUCED BY 3% BUTYL ACID PHOSPHATE ON POLYPROPYLENE

| Salt added: | Grab tensile after 100 hours, lbs./in. |
|---|---|
| Untreated control [1] | 54 |
| Copper acetate | 27 |
| None | 111 |
| Cobalt acetate | 112 |
| Chromium acetate | 127 |
| Zinc acetate | 144 |
| Nickel acetate | 148 |

[1] Original tensile was 211 lbs.

The tabulated data show that the presence of the copper salt reduced the stability over that of the untreated control. The other salts in the treatment, substantially further improved the light stabilization over that given by the butyl acid phosphate alone.

*Example 3*

The influence of nickel with various acid modifying agents was examined. Here another polypropylene fabric was treated with isopropanol-water solutions of various organic phosphoric acids and nickel salt. The acid was predissolved in isopropanol. The salt was dissolved in water. Then the water solution was added to the isopropanol solution with mechanical stirring.

After padding, the swatches were dried for 5 minutes at 105° C. then they were heated 10 min. at 120° C. They were scoured in 0.1% Tergitol NPX at 70° C. for 10 minutes, rinsed and dried (separate scourings). The results of the Fade-Ometer exposures are shown in Table III. The addition of nickel improved the strength retention.

TABLE III.—LIGHT STABILIZING EFFECTS OF VARIOUS MODIFYING ACIDS ALONE AND WITH NICKEL ACETATE

| Acid (3%) | Metal Salt (1%) | Strip Tensile, lbs./in. | |
|---|---|---|---|
| | | Initial | After 100 hours |
| None—Water control | None | 120 | 38 |
| Butyl acid phosphate | do | 123 | 77 |
| Do | Ni Ac | 122 | 109 |
| Octyl acid phosphate | None | 123 | 102 |
| Do | Ni Ac | 123 | 108 |

*Example 4*

Using the padding and heating technique of Example 1, a more detailed examination of the influence of metal ions on the light stability produced by various modifying agents was made. The results are reported in the following table:

TABLE IV.—INFLUENCE OF METAL IONS ON LIGHT STABILITY PRODUCED BY VARIOUS POLYPROPYLENE MODIFYING ACIDS

| Acid (3%) | Metal Salt (0.5%) | Strip Tensile, lbs./in. | |
|---|---|---|---|
| | | Initial | After 100 Hours |
| Water Control | None | 121 | 38 |
| Butyl phosphoric | Copper | 115 | 30 |
| Do | Manganese | 120 | 54 |
| Do | None | 120 | 60 |
| Do | Chromium | 116 | 63 |
| Do | Zinc | 119 | 64 |
| Do | Cadmium | 118 | 87 |
| Do | Cobalt | 121 | 103 |
| Do | Nickel | 120 | 114 |
| Octyl phosphoric | Manganese | 113 | 24 |
| Do | Copper | 122 | 47 |
| Do | None | 115 | 49 |
| Do | Chromium | 117 | 58 |
| Do | Cobalt | 120 | 66 |
| Do | Zinc | 118 | 71 |
| Do | Cadmium | 119 | 94 |
| Do | Nickel | 128 | 100 |

Manganese and copper appear to be generally detrimental to light stability. Nickel, chromium, zinc and cadmium produced the better improvements.

*Example 5*

The procedure of Example 1 was repeated on swatches of fabric woven from polypropylene fibers which possessed greater inherent light instability than the polypropylene of Example 1. The results of the light stability tests run in a Fade-Ometer on the treated swatches are reported in the following table:

TABLE V.—TREATMENT OF SECOND TYPE OF POLYPROPYLENE FABRIC TO IMPROVE LIGHT SENSITIVITY (FABRICS SCOURED AFTER TREATMENTS)

| Treatment Applied—3% | Strip Tensile, lbs./in. | |
|---|---|---|
| | Initial | 100 hours |
| None | 107 | 15 |
| Butyl acid orthophosphate | 113 | 58 |
| Dibutyl acid pyrophosphate | 108 | 38 |
| Ethyl acid orthophosphate | 118 | 57 |
| Isopropyl acid orthophosphate | 112 | 56 |
| Di-isooctyl acid orthophosphate | 111 | 50 |
| Dimethyl acid pyrophosphate | 110 | 51 |

*Example 6*

This example reports test data relating to heat stability of polypropylene fabric.

Swatches of the fabric were padded through a 3% solution of ethyl acid orthophosphate as in Example 1. After the padding, drying and heating at 120° C. for 15 minutes, the swatches were after-treated by exhaustion for one hour at 100° C., in 30:1 bath ratio with solutions of cationic agents which included:
(A) No aftertreatment;
(B) 3% chromium acetate;
(C) 3% zinc acetate;
(D) 3% zirconyl acetate;
(E) 3% nickel acetate.

After exhaustion, the samples were rinsed and dried. Untreated samples were used as controls and these, together with the treated samples were tested for tensile strength. Then samples were subjected to heating according to the following schedule: 10 minutes at 130° C.; 10 minutes at 135° C.; 20 minutes at 140° C.; 20 minutes at 150° C.

After this drastic heating of the samples, they were tested for tensile strength. The strength test results are reported in the following Table VI in pounds per inch of width of sample.

In the untreated fabric, the tensile dropped from 92 to 40 pounds in the heat test. Good improvement was found in the ethylphosphoric acid treated sample. By the exhaustion post treatment, nickel acetate yielded the best results.

TABLE VI.—IMPROVED HEAT STABILIZATION OF POLYPROPYLENE FABRIC PRODUCED BY MODIFYING ACIDS AND CATIONIC AFTERTREATMENTS

| 2d Treatment by Exhaustion | Strip Tensile (lbs./in.) after heat exposure [1] | | | |
|---|---|---|---|---|
| | Untreated | | Ethyl Phosphoric | |
| | B | A | B | A |
| None | 92 | 40 | 118 | 127 |
| Cr Acetate | 109 | 0 | 113 | 44 |
| Zn Acetate | 115 | 73 | 114 | 113 |
| Zr Acetate | 123 | 53 | 127 | 119 |
| Ni Acetate | 115 | 82 | 115 | 131 |

[1] Original tensile of the various fabrics was 110±20 lbs. Samples with the lower tensile were highly discolored and fused.
B = Before heat test. A = After heat test.

*Example 7*

Swatches of scoured fabric woven in plain weave from polypropylene monofilaments were treated with a 5% solution of butyl acid orthophosphate in 1:1 mixture of water and propanol by padding the solution onto the fabric for an 80% pick-up. The wetted fabric was dried for 10 minutes at 90° C. and then heated for 15 minutes at 120° C. One half of these samples were marked "A" and set aside for future strength testing and the remaining samples were immersed in a 5% water solution of zinc acetate and the metal salt exhausted onto the fabric by heating for one hour at 90° C. The samples were then scoured in a solution of 0.1% Tergitol NPX and 0.25% soda ash, rinsed and dried. These samples were designated "B."

These treated samples, with some similar size samples of untreated fabric, were exposed to air circulating in an oven at 160° C. for periods between 2 to 15 minutes. The various samples withdrawn from the oven at the recorded times were then tested for tensile strength using a standard test procedure. The results are reported in the following table in pounds of tensile strength per inch of width.

TABLE VII

| Heating Time | Untreated | "A" | "B" |
|---|---|---|---|
| 2 min | 135 | 136 | 136 |
| 5 min | 128 | 133 | 133 |
| 7 min | 83 | 130 | 135 |
| 10 min | 63 | 128 | 133 |
| 12 min | 20 | 126 | 135 |
| 15 min | 0 | 125 | 133 |

The untreated fabric gradually lost all its strength as the heating increased. After 15 minutes, the untreated specimens had shrunken into a fused plastic sheet.

Other samples of the treated and untreated fabric were laundered 10 times with "Tide" in a home automatic washer at cotton setting, i.e., 60° C. before being subjected to the timed heating at 160° C. The laundered and heated samples were then tested for tensile strength using the procedure as for Table VII. The results are reported in the following Table VIII and show that 10 washings had little effect upon the heat stabilizing effects of the fabric treatments.

TABLE VIII

| Heating Time | Untreated | "A" | "B" |
|---|---|---|---|
| 2 min | 121 | 136 | 139 |
| 5 min | 12 | 134 | 139 |
| 7 min | 0 | 130 | 141 |
| 10 min | 0 | 120 | 129 |
| 12 min | 0 | 130 | 108 |
| 15 min | 0 | 125 | 128 |

*Example 8*

The general procedure of Example 1 was used in applying 3% of various organic phosphoric acids to polypropylene fabric after which the fabric swatches were exposed for 50 and 100 hours to intense actinic light radiation in Fade-Ometer. The results of this exposure was determined by measuring the strength of the fabric before and after the exposures and compared to control swatches. The data are reported in terms of percent of the original strength retained by the swatches in the following table:

TABLE IX

| Treatment | Percent of Original Strength Retained | |
|---|---|---|
| | 50 Hours | 100 Hours |
| Control—none | 59 | 25 |
| Dibutyl acid orthophosphate | 84 | |
| Monobutyl acid orthophosphate | 90 | 70 |
| Dibutyl acid pyrophosphate | 90 | 66 |
| Diethyl acid orthophosphate | 86 | |
| Monoethyl acid orthophosphate | 92 | 80 |
| Isooctyl acid pyrophosphate | 80 | |
| Mono isopropyl acid orthophosphate | 87 | 72 |
| Di-isooctyl acid orthophosphate | 87 | 58 |
| Dimethyl acid pyrophosphate | 90 | |
| Monolauryl acid orthophosphate | 80 | |
| Di-2 ethyl hexyl orthophosphoric acid | 92 | 85 |

*Example 9*

Samples of polypropylene fabrics were treated with water-isopropanol solutions containing: (a) 5% chloromethyl phosphonic acid; (b) 5% phenyl phosphonic acid; (c) 5% phenyl acid orthophosphate.

After padding through these solutions, the fabrics were dried for 10 minutes at 105° C. and then were further heated for 15 minutes at 120° C. Then they were scoured in a solution of 0.25% "Igepon T" and 0.25% $Na_2CO_3$ to remove any unreacted materials, rinsed and dried for 5 minutes at 105° C.

The resulting treated polypropylene fabrics and a piece of the original untreated fabric were dyed in a solution containing 5%, based on fabric weight, of the cationic dye Sevron Yellow L (Basic Yellow #13). The bath:fabric ratio was 30:1. The samples were immersed in the dye solution at 30° C. The bath was raised to 90° C. in one hour. Dyeing was continued for one hour at 90° C. After this, the samples were removed from the dye bath and were scoured with a solution of 0.25% Igepon T and 0.25% $Na_2CO_3$ rinsed and dried for 5 minutes at 105° C. The treated samples *a*, *b*, and *c* were deeply dyed a bright yellow color. Cross-sections made on the fibers showed that the dye had penetrated throughout the fiber mass. The piece of untreated polypropylene was not dyed and remained white.

These same treated fabrics were also dyed with four other cationic dyes and similar results were obtained.

Example 10

Polypropylene fabrics treated as in Example 9, but not dyed, were subjected to a heat test to determine heat resistance. Here, the pieces of treated and one untreated fabric were placed in air circulating oven for one hour at 150° C. Another set of the same fabric was washed at 70° C. for one hour in a solution of 0.25% $Na_2CO_3$ 0.5% soap, rinsed and dried. Then this washed set was also heated for one hour at 150° C. The tensile strength of the original fabrics and after the various heat tests was measured. The results are shown below:

TABLE X

| Fabric Sample | Warp Strip Tensile, Lbs./In | | |
|---|---|---|---|
| | Original | 1 Hour/ 150° C. | Washed plus 1 Hour/ 150° C. |
| Untreated | 123 | 40 | 0 |
| #a | 121 | 130 | 133 |
| #b | 123 | 122 | 131 |
| #c | 121 | 125 | 127 |

The untreated fabric lost practically all of its strength on the heat exposure. After the wash and heat test, it had completely charred and melted into a plastic blob of matter. The various organic phosphonic and phosphoric acid treated polypropylene fabrics lost no strength, remained white, and still maintained their flexible fiber structure after the two heat tests.

DISCUSSION OF DETAILS

There are numerous organic substituted phosphoric acids commercially available that may be used in carrying out the heat and light stabilizing procedures of this invention. Furthermore, it is probable that technological advances will provide additional useable materials some of which will become commercially available. Such existing, as well as future, organic substituted phosphoric acids within the class as hereinbefore defined contemplated for use with the invention. It is not suggested that all of the acids are equally effective. Some may be found as a result of simple testing, utilizing the concepts and instructions contained in this disclosure, that are more effective with certain polyolefins than with others. Thus, the polyolefins may be produced by a variety of different polymerization methods using different catalysts and the different polyolefins have different degrees of orientation or crystallinity as well as different catalytic impurities which may respond more effectively to one particular stabilizing agent used in accordance with the invention as opposed to another. The results which have been attained through the use of alkyl acid orthophosphates and alkyl acid pyrophosphates in which the alkyl substituent contains 2 to 20 carbon atoms have been particularly good. Other specific acids which may be advantageously used are those in which the radicals R and R' of the designated formula are aryl radicals containing 6 to 12 carbon atoms.

By way of guidance in specific selection of organic phosphoric acids for use in carrying out the new operations, there are the following: dibutyl acid orthophosphate; butyl diacid orthophosphate; diethyl acid orthophosphate; ethyl diacid orthophosphate; isooctyl diacid pyrophosphate; isopropyl diacid orthophosphate; di-isooctyl acid orthophosphate; dimethyl acid pyrophosphate; di-2-ethylhexyl orthophosphoric acid; lauryl diacid orthophosphate; glycerol orthophosphoric acid; stearyl acid orthophosphate; phenly orthophosphoric acid; methyl phenyl acid orthophosphate; benzyl diacid pyrophosphate; lauryl butyl acid orthophosphate; cyclohexyl diacid orthophosphate; napthyl diacid pyrophosphate; p-hexylphenyl methyl phosphoric acid; chloromethyl phosphonic acid; phenyl phosphoric acid; chloromethyl phenyl acid orthophosphate; phenyl p-chlorophenyl acid orthophosphate; bromomethyl lauryl acid pyrophosphate; p-chlorophenyl phosphonic acid; lauryl phosphonic acid; ethylene bis(lauryl acid orthophosphate); propylene bis-phenyl diphosphonate; phenylene bis (hexyl acid orthophosphate); methyl ester of phenyl phosphonic acid; benzyl ester phenyl phosphonic acid; cyclohexyl ester of methyl phosphonic acid.

The organic substituted phosphoric acids that are used may be chemically pure compounds or commercial mixtures which, in turn, may be derived from commercial mixture reagents, e.g., the alkyl, cycloalkyl or aryl substituents may be from alcohol mixtures formed by the oxo process, Ziegler addition products, alcoholation of oils, rosin products, naphthenic acid esters and the like.

A variety of heavy metal salts to be used in the new stabilizing treatments are contemplated. Broadly stated, the usable heavy metal salts may be represented by the following general formula:

$$M_xA_y$$

wherein M is a cation of a heavy metal selected from the group consisting of cadmium, chromium, cobalt, nickel, tin and zinc.

A is the anion of a weak acid, preferably an acid having a dissociation constant less than the organic substituted phosphoric acid used in the stabilizing treatment, $x$ is an integer equal to the valence of said anion, and $y$ is an integer equal to the valence of said cation.

Advantageously, one may use weak acids, particularly organic acids, which form salts of the heavy metal that are relatively soluble in water, i.e., have a solubility of at least about 1 gram per liter of water. By way of example of such acids, there are acetic acid, citric acid, tartaric acid and the like. In addition, the heavy metal salt of the organic substituted phosphoric acid may be generated by reaction of the phosphoric acid with reactive forms of the hydroxide or oxides of the heavy metal e.g., tributyl tin oxide.

The preparation of heavy metal salt of the organic phosphoric acid may be varied. As shown by some of the examples, the heavy metal salt may be omitted. Conversely, a quantity up to the stoichiometeric amount required to form the heavy metal salt of the phosphoric acid by metathesis may be used, and even an excess over this can be used if desired. Advantageously, a ratio of about 0.1 to 1 mol of heavy metal salt per mol of organic phosphoric acid is used.

The treatment of the polyolefin materials may be carried out in any suitable stage. For example, in the case of continuous filaments, the treatment with the organic phosphoric acids may be accomplished immediately after spinning. In the case of yarns made of spun staple fibers, the treatment can be effected before the yarns are formed by operation upon the staple fiber or after formation of the yarn. Alternatively, fabrics can be woven from untreated monofilaments or spun yarn, after which they can be subjected to the new treatments and then dyed, colored, coated or subjected to other operations. This gives great flexibility to manufacturers and users of polyolefin fibers, films or other articles. Also, the new operations do not require large investments in special processing equipment or in special training of personnel. Thus, the new treatments may be carried out in conventional coating or impregnating machines such as roller coaters, blade coaters, jig, beck and pad-steam ranges, pressure equipment or the like.

In order to effect a permanent association of the treating reagent with the polyolefin fibers or other articles, one employs what may be referred to as a heating or aging step. This may be accomplished by heating the article in contact with the treating reagent to elevated temperatures, e.g., 100° to 150° C., for a period of about 0.1 to 120 minutes, preferably 1 to 15 minutes, depending to some extent upon the degree of modification desired and other considerations. The higher the temperature, normally the less time is required for the predetermined degree of modification to be attained. Temperatures within the range of about 50° C. up to about 10° C. below the melting point of the polymer are useable. This thermal fixing phase of the treating methods may be effected by other ways than direct heating, e.g., flash diffusion of the treating agent under pressure or in the presence of superheated steam, steam distillation onto the surface to be treated, or boiling from suitable solvent solutions of the treating agents.

After the treatment of the polyolefin article with the treating reagent, it is normally desirable to remove surplus treating agent, i.e., any of the treating material which has not become durably enough associated with the article to keep it from being removed by normal scouring, dry-cleaning or other normal handling of the article. Surplus agent removal, particularly in the case of fibers and textiles, is typically carried out by scouring the material to remove the loosely held treating reagent. For this purpose, conventional textile scouring techniques, dry-cleaning techniques or the like may be employed. Such cleaning procedures are generally followed by rinsing or drying, but the treatment procedure may be immediately followed by other treating or fabricating steps without cleaning the surplus treating agent from the article surface. This is particularly true where surplus treating agents would have no detrimental effect upon dyeing, coloring, printing or subsequent coating compositions.

The organic phosphoric acids or other materials which constitute critical treating reagents may be used in undiluted form, but more satisfactorily they are dissolved or dispersed in some suitable solvent or dispersing liquid which may include organic solvents such as hydrocarbon solvents, 1–8 carbon alkanols, dialkyl ethers, esters or the like. Various concentrations of the treating compounds relative to the polyolefin may be employed. For example, in a padding method of applying the treating material from a solution, satisfactory results may be obtained by the deposition of about 0.1 to 10% by weight of treating agent based upon the weight of the polyolefin. Deposition of between about 0.5 and 2% by weight of the treating compound has been found to be particularly useful. In terms of amount of agent per area of treated surface, one may advantageously use about 0.01 to 2 grams of active reagent, i.e., organic phosphoric acid per se, or its salt, or such acid plus the metal salt, per square meter of article surface. Where the polyolefin being treated is less prone to deterioration by heat or light, lower concentrations of the treating reagent are most economical to use. In general, the amount of treating reagent deposited is determined by the degree of stabilization required. The concentration of the solution of treating reagent will likewise depend upon the degree of modification desired and also the proportion of solution to be applied relative to the treated article solutions of the treating reagent and concentration of 0.1 to 100% are useable. Typically, concentrations of 1 to 5% produce satisfactory modification.

The treating solutions or other systems may include auxiliary agents to improve wash fastness, oil-repellency or other aspects of the final products. Such auxiliary agents would, for example, include synthetic resins, e.g., acrylic resins, amino-aldehyde resins, vinyl resins as well as wetting agents, leveling agents, emulsifiers, anti-oxidants, light-preserving agents or the like.

The invention is applicable to treatment of any articles made of solid polymers of olefins which, in the absence of the treatment would have a propensity to acquire static electrical charges, undergo decomposition or deteriorate upon prolonged exposure to heat or light. These olefin polymers which are of particular importance with respect to the new treatments are the class of solid polymers that have an inherent viscosity of at least 0.8 and particularly those having an inherent viscosity between about 1.2 and about 10. The term "inherent viscosity" as used herein, means the viscosity of a solution of 0.2 gram of the polymer in 50 cc. of tetralin at 130° C. The invention finds special applicability to the treatment of solid polymers of alpha-olefins of 2 to 6 carbon atoms, e.g., ethylene, propylene, 4-methyl-pentene-1, etc.

The various types of olefin polymers which may be treated in accordance with the invention are extensively described in the patent and technical literature, e.g., see "Encyclopedia of Chemical Technology," first supplement volume (1957), pp. 699–712 and second supplement volume (1960), pp. 661–672. Unquestionably, yet unknown olefin polymers will be developed to which the procedures of the invention may be applied.

The new surface treatment procedures are applicable both to homopolymers of olefins and interpolymers of olefins with unsaturated hydrocarbons or other polymerizable materials resulting in solid polymers that need heat and/or light stabilization. The new procedures are of particular importance in the treatment of fiber-forming polymers such as fiber-forming polyethylene, polypropylene or other homopolymers or copolymers of 2 to 6 carbon atom α-olefins. The Textile Fiber Products Identification Act (Public Law 84–897), defines olefins fibers as "any manufactured fiber in which the fiber-forming substance is a long chain synthetic polymer composed of at least 85% by weight of ethylene, propylene or other olefin units." The new treatments of this invention are contemplated for use in connection with all olefin fibers as so defined.

The new heat and light stabilizations are applicable to substantially any preformed article of solid polyolefin, e.g., films, filaments, yarns, fabrics, sheets, rods, tubes and other molded, cast, or extruded shapes. Articles that comprise other plastics or metals may be treated unless the treating reagents react with, corrode or otherwise harm the additional component. In the case of yarns and fabrics, the new treatments may be for stabilization of polyolefin fibers when they constitute portions of blended yarns or fabrics, e.g., fabrics of polyolefin fibers, woven in admixture with polyester fibers, nylon fibers, silk fibers, cotton fibers or the like. On the other hand, it may be preferable to treat the olefin fibers prior to the weaving, knitting or other fabrication of the blended fabric.

The new heat and light stabilization procedures as described above provide for the speedy, practical treatment of preformed polyolefin textiles and mitigate the need to add stabilizers to the polymer before fiber spinning. There is produced substantial improvement in heat and light stability of polyolefins which is especially important for film and textile products used for outdoor purposes, e.g., marine cordage, tow ropes, parachute cloth, patio and lounge furniture and the like.

I claim:
1. A process of improving the heat and light stability of articles made of solid polyolefins which comprises:
   (A) wetting the surface of the article with a solution consisting essentially of between about
      (1) 0.1 and 25% by weight of alkyl acid orthophosphate in which the alkyl radical contains between 2 and 20 carbon atoms, and
      (2) solvent having a boiling point below about 150° C.,
   (B) drying the resulting wetted surface by evaporation of volatile solvent leaving as a residue a substantially uniform layer of alkyl acid orthophosphate,
   (C) heating the dried surface to a temperature at least 10° C. below the melting point of the polyolefin of which the surface is formed between about 100° and 150° C. for between about 1 to 15 minutes to imbue the surface with alkyl acid orthophosphate,
(D) contacting the resulting treated surface with an aqueous solution containing about 1 to 25% by weight of a salt formed of a metal selected from the group consisting of cadmium, chromium, cobalt, nickel, tin and zinc, and a weak acid having a dissociation constant less than said alkyl acid orthophosphate,
(E) heating the surface while in contact with said aqueous solution at a temperature between about 50° and 100° C. until at least a portion of metal has been exhausted from the solution onto said surface, and
(F) scouring the article surface to remove excess treating materials, rinsing and drying the article.

2. A process as claimed in claim 1 wherein said weak acid is acetic acid.

3. A process as claimed in claim 1 wherein said salt is nickel acetate.

4. A process as claimed in claim 1 wherein said salt is zinc acetate.

5. A process as claimed in claim 1 wherein the reagent of step (A) is ethyl acid orthophosphate, the salt of step (D) is nickel acetate and the solvent of step (A) is a mixture of water and isopropanol.

6. A process of treating the articles made of solid polyolefins that undergo appreciable deterioration of the polyolefin upon exposure of the article to heat and light which comprises:
(A) providing a solution consisting essentially of:
(1) an organic phosphoric acid selected from the group consisting of alkyl acid orthophosphates and alkyl acid pyrophosphates in which the alkyl substituent contains 2 to 20 carbon atoms, and
(2) the acetic acid salt of a metal selected from the group consisting of cadmium, chromium, cobalt, nickel, tin and zinc,
(B) applying the solution to the surface of an article made of solid polyolefin in an amount providing about 0.01 to 2 grams of combined active materials (1) and (2) per square meter of said surface,
(C) drying said article by evaporation of volatile solvent from said solution leaving as a uniform layer, the residue of said active materials on the article surface,
(D) heating the dried surface to a temperature at least 10° C. below the melting point of the polyolefin of which the surface is formed between about 100 and 150° C. for between about 0.1 and 120 minutes sufficient to imbue the surface with a durably retained portion of a salt produce of said active materials (1) and (2), and
(E) scouring, rinsing and drying the treated article.

7. A process of improving the heat and light stability of fibers formed of solid polyolefin which comprises:
(A) padding onto fibers formed of solid polyolefin a solution consisting essentially of 50 parts by weight of water, 50 parts isopropanol and 5 parts butyl acid orthophosphate to give a pick-up of between about 20 to 100% by weight of said solution based upon the weight of the fibers,
(B) drying the fibers and then heating the dried fibers to 120° C. for about 15 minutes,
(C) immersing the resulting fibers in an aqueous solution containing 5% zinc acetate at a temperature about 95° C. for about one hour,
(D) scouring the treated fibers to remove any excess treating material not durably affixed to the fibers, and
(E) drying the fibers which have an appearance equivalent to starting fibers although possessing improved stability against deterioration when subject to the normally destructive effects of heat and light upon the polyolefin.

8. A process of improving the heat and light stability of articles made of solid polyolefins which comprises:
(A) applying to the surface of a preformed article made of solid polyolefin an organic substituted phosphoric acid selected from the group consisting of acids of the following general formula:

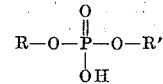

wherein R is a radical selected from the group consisting of hydrogen, alkyl, cycloalkyl and aryl; R' is a radical selected from the group consisting of alkyl, cycloalkyl, aryl, and

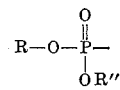

and R'' is a radical selected from the group consisting of alkyl, cycloalkyl, aryl, and
(B) also applying to said surface a heavy metal salt of the following general formula:

$$M_xA_y$$

wherein M is the cation of a heavy metal selected from the group consisting of cadmium, chromium, cobalt, nickel, tin and zinc, A is the anion of a weak acid, $x$ is an integer equal to the valance of said anion, and $y$ is an integer equal to the valence of said cation, and
(C) heating the article surface and the applied combination of organic phosphoric acid and heavy metal salt to a temperature at least 10° C. below the melting point of the solid polyolefin of which the article is formed between about 100° to 150° C. for a time between about 1 to 15 minutes sufficient to imbue the article surface with at least a portion of said applied substances.

9. A preformed article formed of solid polyolefin, the article having improved heat and light stability by comprising about between 0.1 and 5% by weight based upon the weight of the article of a metal salt of the general formula:

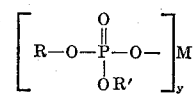

wherein R is a radical selected from the group consisting of hydrogen, alkyl, cycloalkyl and aryl; R' is a radical selected from the group consisting of alkyl, cycloalkyl, aryl and

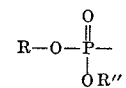

and R'' is a radical selected from the group consisting of alkyl, cycloalkyl, aryl, and M is the cation of a metal selected from the group consisting of cadmium, chromium, cobalt, nickel, tin and zinc, and $y$ is an integer equal to the valence of said cation, said metal salt being concentrated primarily in the surface portions of the article.

10. An article formed of solid polyolefin having improved heat and light stability by reason of the durable retention in the surface of the article of a heavy metal salt of an organic phosphoric acid selected from the group consisting of alkyl acid orthophosphates and alkyl acid pyrophosphates in which the alkyl substituent contains 2 to 20 carbon atoms, said heavy metal being selected from the group consisting of cadmium, chromium, cobalt, nickel, tin and zinc proportions of said article other than said surface being substantially face of said heavy metal salt.

11. Polypropylene fibers of improved heat and light stability comprising between about 0.1 and 5% by weight based upon the weight of the fibers of the nickel salt of butyl diacid orthophosphate, there being a greater concentration of said salt in the surface of the fibers than in the central portion of the fibers.

References Cited by the Examiner

UNITED STATES PATENTS

| | | | |
|---|---|---|---|
| 3,072,601 | 1/1963 | Breslow | 260—439 X |
| 3,145,073 | 8/1964 | Gagliardi | 8—100 |
| 3,163,492 | 12/1964 | Thomas | 260—45.75 |
| 3,215,715 | 11/1965 | Wurstner | 260—439 X |
| 3,243,394 | 3/1966 | Dietz | 260—45.75 X |

WILLIAM D. MARTIN, *Primary Examiner.*

R. HUSACK, *Assistant Examiner.*